US008806415B1

(12) United States Patent
Ding et al.

(10) Patent No.: US 8,806,415 B1
(45) Date of Patent: Aug. 12, 2014

(54) INTEGRATED CIRCUIT PAD MODELING

(71) Applicant: International Business Machines Corporation, Armonk, NY (US)

(72) Inventors: Hanyi Ding, Colchester, VT (US); Kai D. Feng, Hopewell Junction, NY (US); Hailing Wang, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/768,112

(22) Filed: Feb. 15, 2013

(51) Int. Cl.
*G06F 17/50* (2006.01)

(52) U.S. Cl.
CPC ........ *G06F 17/5036* (2013.01); *G06F 17/5081* (2013.01)
USPC .............. 716/136; 716/106; 716/111; 703/14

(58) Field of Classification Search
None
See application file for complete search history.

(56) References Cited

U.S. PATENT DOCUMENTS

| | | | | |
|---|---|---|---|---|
| 5,946,211 | A * | 8/1999 | Glover ............................. | 700/97 |
| 7,003,744 | B2 * | 2/2006 | Weller et al. ................... | 716/103 |
| 7,061,344 | B2 * | 6/2006 | Lee et al. ........................ | 333/103 |
| 7,082,585 | B2 * | 7/2006 | Gasparik et al. .............. | 716/111 |
| 7,212,960 | B2 * | 5/2007 | Quint et al. ..................... | 703/14 |
| 7,269,810 | B1 * | 9/2007 | Weller et al. ................... | 716/115 |
| 7,557,425 | B2 * | 7/2009 | Sundstrom ..................... | 257/532 |
| 7,895,540 | B2 * | 2/2011 | Engin et al. .................... | 716/106 |
| 2002/0143510 | A1 | 10/2002 | Peters et al. | |
| 2003/0141501 | A1 | 7/2003 | Komurasaki et al. | |
| 2010/0332193 | A1 | 12/2010 | Hu et al. | |
| 2011/0057302 | A1 | 3/2011 | Spehar et al. | |
| 2011/0304944 | A1 | 12/2011 | Salcedo et al. | |

FOREIGN PATENT DOCUMENTS

| | | |
|---|---|---|
| CN | 101626002 | 1/2010 |
| KR | 20090129710 | 12/2009 |
| WO | 2010087407 | 8/2010 |

OTHER PUBLICATIONS

Clark et al., "Radiation Hardened by Design Digital I/O for High SEE and TID Immunity", IEEE Transactions on Nuclear Science, vol. 56, No. 6, Dec. 2009, pp. 3408-3414.
Poh et al., "De-Embedding Transmission Lines Using a Full-Wave EM-Simulated Pad Model", Proceedings of Asia-Pacific Microwave Conference, 2010, IEICE, pp. 1208-1211.
Weng, "Error Correction in High-Frequency "on-Wafer" Measurements", Proc. IEEE 1994 International Conference on Microelectronic Test Structures, vol. 7, Mar. 1994, pp. 164-167.
Zheng et al., "Modeling of 3-D Planar Conducting Structures on Lossy Silicon Substrate in High Frequency Integrated Circuits", IEEE MTT-S Digest, 2001, pp. 1265-1268.
Nam et al., "Pad Shape Effects on High Frequency Signal Transfer Characteristics", Electrical Design of Advanced Packaging and Systems Symposium, 2008, pp. 117-119.

* cited by examiner

*Primary Examiner* — Leigh Garbowski
(74) *Attorney, Agent, or Firm* — Anthony Canale; Roberts Mlotkowski Safran & Cole, P.C.

(57) ABSTRACT

A method of modeling an integrated circuit chip includes generating a model of a bond pad using a design tool running on a computer device. The method also includes connecting a first inductor, a first resistor, and a first set of parallel-resistor-inductor elements in series between a first node and a second node in the model. The method further includes connecting a second inductor, a second resistor, and a second set of parallel-resistor-inductor elements in series between the second node and a third node in the model. The first node corresponds to a first signal port of the bond pad. The second node corresponds to a second signal port of the bond pad.

20 Claims, 7 Drawing Sheets

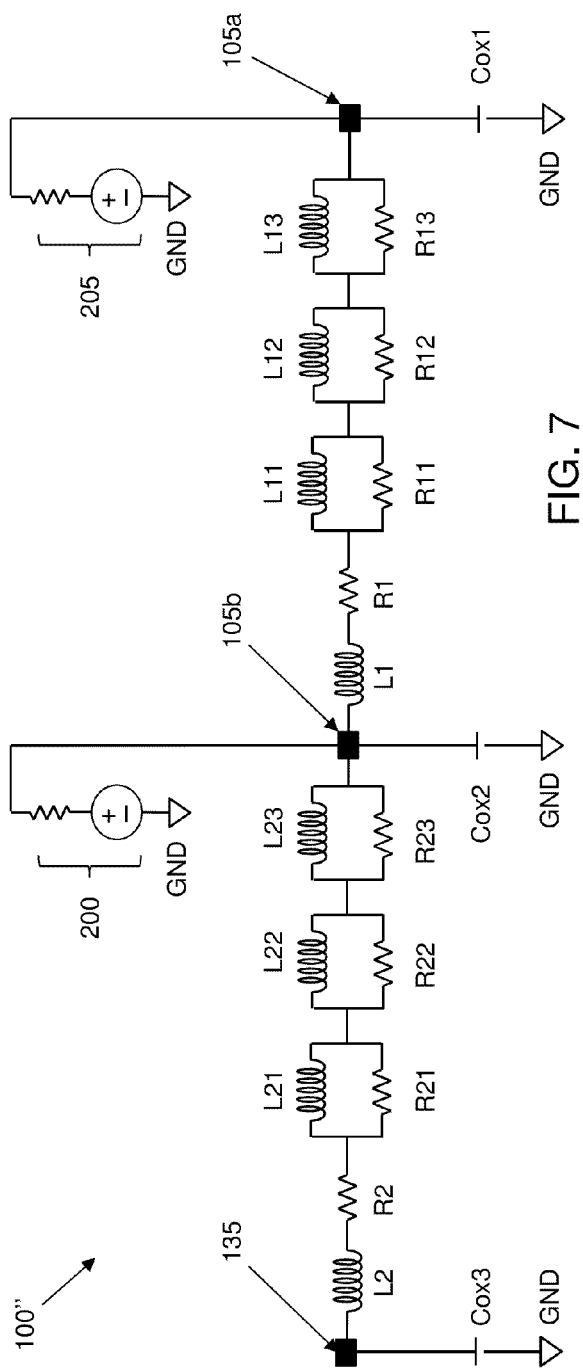
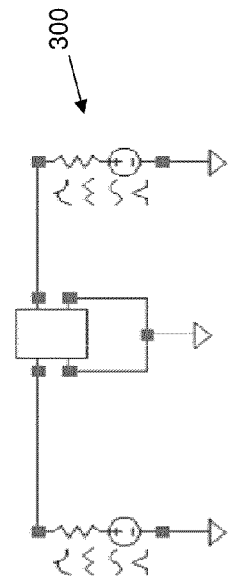
FIG. 7
FIG. 8

INTEGRATED CIRCUIT PAD MODELING

FIELD OF THE INVENTION

The invention relates to modeling of integrated circuit devices and, more particularly, to modeling of integrated circuit bond pads.

BACKGROUND

Automated design of integrated circuits utilizes computer-based simulations that incorporate models of the elements contained in the design. The accuracy of the underlying models thus has a significant impact on the confidence of the simulation results and on the design as a whole. An element included in a circuit design may be a bond pad.

An integrated circuit bond pad is the physical interface between the internal wiring and circuitry of an integrated circuit chip and external devices, such as a package or printed circuit board. An accurate model for the bond pad is important in obtaining first-time-right designs, e.g., designs that behave as predicted when they are physically manufactured. Computer-based models of bond pads (e.g., pad models) are commonly based on the assumption of a single signal port, e.g., the input and output of the pad are modeled as a single instance. This approach works well at low frequencies, but breaks down at high frequencies (e.g., millimeter wave and higher) since the single port model does not account for propagation along the pad and also fails to adequately account for parasitic inductance and resistance.

SUMMARY

In a first aspect of the invention, there is a method of modeling an integrated circuit chip. The method includes generating a model of a bond pad using a design tool running on a computer device. The method also includes connecting a first inductor, a first resistor, and a first set of parallel-resistor-inductor elements in series between a first node and a second node in the model. The method further includes connecting a second inductor, a second resistor, and a second set of parallel-resistor-inductor elements in series between the second node and a third node in the model. The first node corresponds to a first signal port of the bond pad. The second node corresponds to a second signal port of the bond pad.

In another aspect of the invention, there is a computer program product for modeling an integrated circuit chip, the computer program product comprising a computer readable storage medium having program code embodied therewith. The program code is readable and/or executable by a processor of a computer device to perform a method comprising: generating, by the processor, a model of a bond pad; connecting, by the processor, a first combination of inductors and resistors between a first node and a second node in the model; connecting, by the processor, a second combination of inductors and resistors between the second node and a third node in the model; and connecting, by the processor, a first capacitor between the first node and a fourth node, a second capacitor between the second node and a fifth node, and a third capacitor between the third node and a sixth node. The first node represents a first signal port of the bond pad. The second node represents a second signal port of the bond pad. The first signal port and the second signal port are at different locations on the bond pad.

In another aspect of the invention, there is a method in a computer-aided design system for generating a functional design model of a bond pad. The method includes generating a functional representation of a first combination of inductors and resistors connected in series between a first node and a second node. The method also includes generating a functional representation of a second combination of inductors and resistors connected in series between the second node and a third node. The method further includes generating a functional representation of a first capacitor between the first node and a fourth node, a second capacitor between the second node and a fifth node, and a third capacitor between the third node and a sixth node. The first node represents a first signal port of the bond pad. The second node represents a second signal port of the bond pad. The first signal port and the second signal port are at different locations on the bond pad.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIG. 7 shows an exemplary implementation of the pad model of FIG. 6 in accordance with aspects of the invention;

FIG. 8 shows a reference model of two port S-parameters from an electromagnetic simulation;

DETAILED DESCRIPTION

The invention relates to modeling of integrated circuit devices and, more particularly, to modeling of integrated circuit bond pads. According to aspects of the invention, a pad model utilizes two signal ports instead of one signal port. In embodiments, the pad model also includes tunable circuitry that, when used in conjunction with the two signal ports, provides the ability to accurately model all parasitics (e.g., inductance, capacitance, and resistance) as well as skin effect, propagation effect, and radiation effect. In this manner, implementations of the invention provide a more accurate model of a bond pad that can be used with confidence in high frequency circuit designs.

Figure 1:
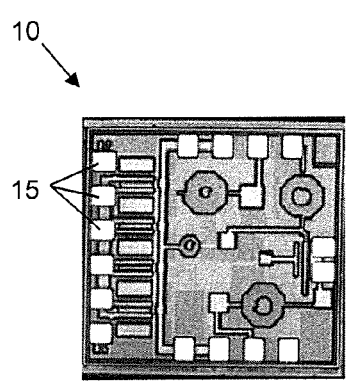
FIG. 1 shows an integrated circuit chip with bond pads.

FIG. 1 shows a top-down (e.g., plan) view of an integrated circuit chip 10 that includes plural bond pads 15. The bond pads 15 are the interface between the internal devices of the chip and the off-chip connections, such as testers, other chips, packages, and printed circuit boards.

Figure 2:
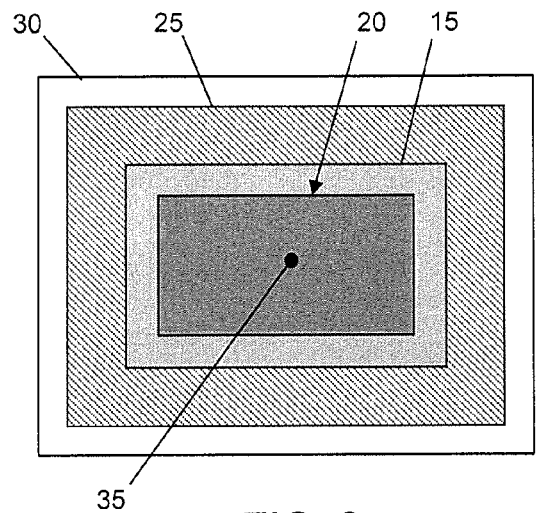
FIG. 2 shows a diagram of a bond pad.

FIG. 2 shows a top-down (e.g., plan) diagram of one of the pads 15, e.g., from the chip 10 of FIG. 1. The pad 15 typically comprises a metal layer that is covered by one or more final layers (e.g., passivation layers) of the chip. An upper surface of the pad 15 is exposed by an opening 20 formed in the final layer(s). The pad 15 may have a ground plane 25, which can shield the pad 15 from the underlying substrate 30. The ground plane 25 can be a high resistivity silicon area, for example. The pad 15 typically has a rectangular shape in plan view, although other shapes such as square or octagon can also be used, and a single location 35 is used to represent the location of signals coming into the pad 15 and signals going out of the pad 15.

Figure 3:
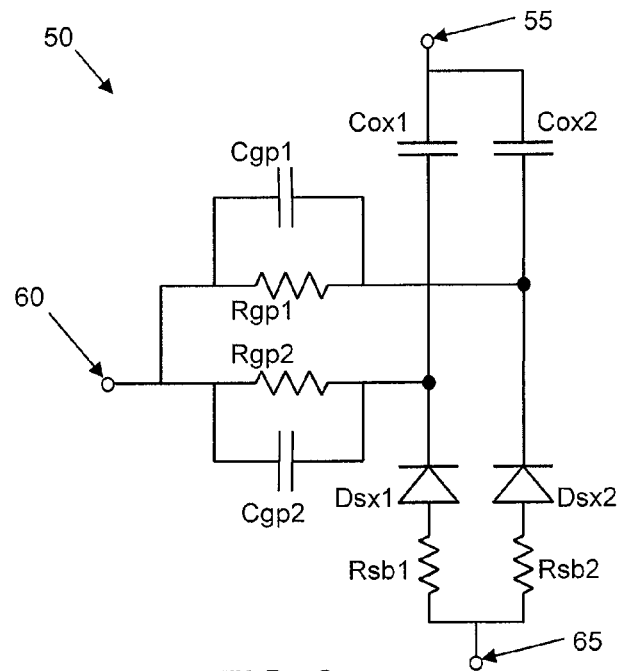
FIG. 3 shows a pad model diagram.

FIG. 3 shows a topology of a pad model 50 that may be used in a computer based integrated circuit design tool (e.g., SPICE, Cadence, etc.). The model 50 utilizes a single port (e.g., node) 55 to represent a signal input and output location (e.g., port 35 of pad 15 of FIG. 2). The model 50 also includes a node 60 representing the ground plane (e.g., ground plane 25 in FIG. 2) and a node 65 representing the substrate contact (e.g., the substrate contact of substrate 30 in FIG. 2).

Still referring to the model 50, Cox1 and Cox2 represent oxide capacitance between the bond pad and the ground plane. Rgp1 and Rgp2 represent the resistance of the ground plane, while Cgp1 and Cgp2 represent the capacitance of the ground plane. Dsx1 and Dsx2 represent the P-N junction behaviors between the ground plane and the substrate. Rsb1 and Rsb2 represent the series resistance from the diodes Dsx1 and Dsx2 to a substrate contact.

Figure 4:
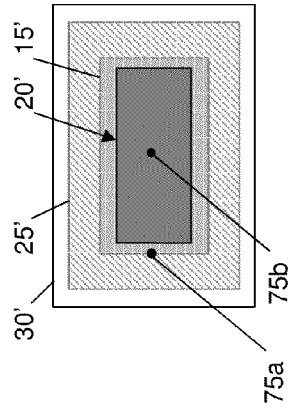
FIG. 4 shows a diagram of a bond pad in accordance with aspects of the invention.

FIG. 4 shows a top-down (e.g., plan) diagram of a pad 15' modeled with two signal ports 75a and 75b in accordance with aspects of the invention. Also shown in FIG. 4 are the pad opening 20', ground plane 25', and substrate 30', which are similar to the same elements as described in FIG. 2. In embodiments, the pad 15' is modeled with the second port 75b at a substantially central location of the footprint of the pad 15' and the first port 75a at one of the side edges of the footprint of the pad 15', although other respective locations may be used within the scope of the invention. The second port 75b represents a location where a signal arrives at or leaves the pad via an external connection, e.g., a wire, a solder ball or a copper pillar connected to a package or printed circuit board. The first port 75a represents a location where a signal arrives at or leaves the pad via an internal connection, e.g., a wire, within the chip in which the pad 15' is included. The use of two ports 75a and 75b approximates that actual behavior of a bond pad more accurately than the single port model (e.g., as in FIGS. 2 and 3), particularly at higher frequencies (e.g., millimeter wave and higher) where parasitics, skin effect, propagation effect, and/or radiation effect alter the output signal (e.g., exiting the pad) relative to the input signal (e.g., entering the pad).

Figure 5:
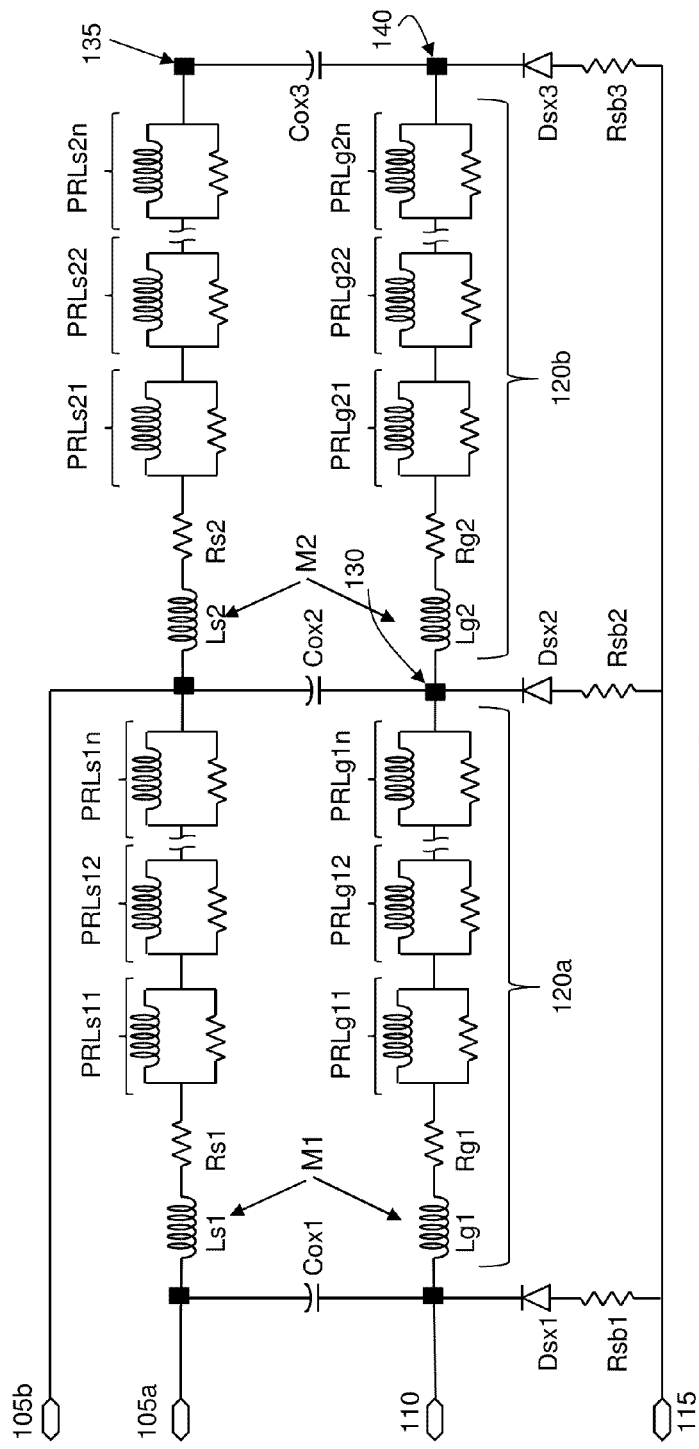
FIG. 5 shows a pad model diagram in accordance with aspects of the invention.

FIG. 5 shows a topology (e.g., a general equivalent circuit) of a pad model 100 in accordance with aspects of the invention. In embodiments, the model 100 includes a first node 105a and a second node 105b that correspond to the first port 75a and second port 75b as described with respect to FIG. 4. The model 100 also includes a node 110 representing the ground plane (e.g., ground plane 25') and a node 115 representing the substrate (e.g., substrate 30').

In accordance with aspects of the invention, the model 100 includes a number of sections 120a and 120b connected to the nodes 105a, 105b, 110, 115 as shown in FIG. 5. Two sections 120a and 120b are shown, but any number of sections may be used within the scope of the invention. In embodiments, the sections 120a and 120b are identical in that they contain the same elements arranged in a similar configuration, although it is envisioned that the sections 120a and 120b may differ from one another based on the design requirements of the model 100.

Still referring to the model 100 of FIG. 5, section 120a includes a first inductor Ls1, a first resistor Rs1, and a first string of PRLs (parallel-resistor-inductors), e.g., PRLs11, PRLs12, . . . , PRLs1n, all connected in series between node 105a and node 105b. In embodiments, section 120a also includes a second inductor Lg1, a second resistor Rg1, and a second string of PRLs, e.g., PRLg11, PRLg12, . . . , PRLg1n, all connected in series between node 110 and node 130. All corresponding inductors, such as Ls1 and Lg1, may have mutual coupling between them, i.e., a mutual inductance M1, which is determined by the distance between pad and the ground plane and the property of the ground plane. The sizes of the inductors Ls1 and Lg1 and the resistors Rs1 and Rg1 may be individually tuned (e.g., adjusted) in the model, and they combine with the capacitance components to account for propagation effect in the pad. Propagation effect is a phenomenon that causes an output signal (e.g., a signal leaving the pad 15' at port 75a) to vary in amplitude and/or phase relative to the input signal (e.g., a signal entering the pad 15' at port 75b). Each PRL (e.g., PRLs1n, PRLg1n, etc.) includes a resistor and an inductor connected in parallel. In embodiments, the number of PRLs (i.e., n) and the sizes of the inductor and the resistor in each PRL may be individually tuned (e.g., adjusted) to account for skin effect in the pad. Skin effect is a phenomenon that causes the resistance of a wire to change as a function of frequency.

As described herein, section 120b includes the same elements as section 120a. Accordingly, section 120b includes a first inductor Ls2, a first resistor Rs2, and a first string of PRLs, e.g., PRLs21, PRLs22, . . . , PRLs2n, all connected in series between node 105b and node 135. In embodiments, section 120b also includes a second inductor Lg2, a second resistor Rg2, and a second string of PRLs, e.g., PRLg21, PRLg22, . . . , PRLg2n, all connected in series between node 130 and node 140. Also, section 120b includes mutual inductances between corresponding inductors, such as M2 between Ls2 and Lp2.

With continued reference to FIG. 5, the model 100 includes a first capacitor Cox1 connected between nodes 105a and 110, as second capacitor Cox2 connected between nodes 105b and 130, and a third capacitor Cox3 connected between nodes 135 and 140. In accordance with aspects of the invention, the sizes of the capacitors Cox1, Cox2, and Cox3 may be individually tuned (e.g., adjusted) in the model. They may thus be combined with the inductive components to account the propagation effect mentioned previously. Also, tuning Cox3 can be used to account for radiation effect. Radiation effect is a phenomenon that causes an output signal (e.g., a signal leaving the pad 15' at port 75a) to vary in amplitude and/or phase relative to the input signal (e.g., a signal entering the pad 15' at port 75b) due to a radiation loss. In embodiments, the sizes of Cox1 and Cox2 are fixed in the relation Cox2=2*Cox1, and the size of Cox3 is separately tuned to adjust for radiation effect; however, the invention is not limited to this implementation and any suitable sizes may be used for these parameters.

In embodiments, the model 100 includes a first resistor Rsb1 and diode Dsx1 connected in series between node 115 and 110, a second resistor Rsb2 and diode Dsx2 connected in series between node 115 and 130, and a third resistor Rsb3 and diode Dsx3 connected in series between node 115 and 140. The sizes of these three resistors and diodes may be tuned to account for parasitic resistance, capacitance and PN junction type behavior between the substrate and the ground plane.

Figure 6:
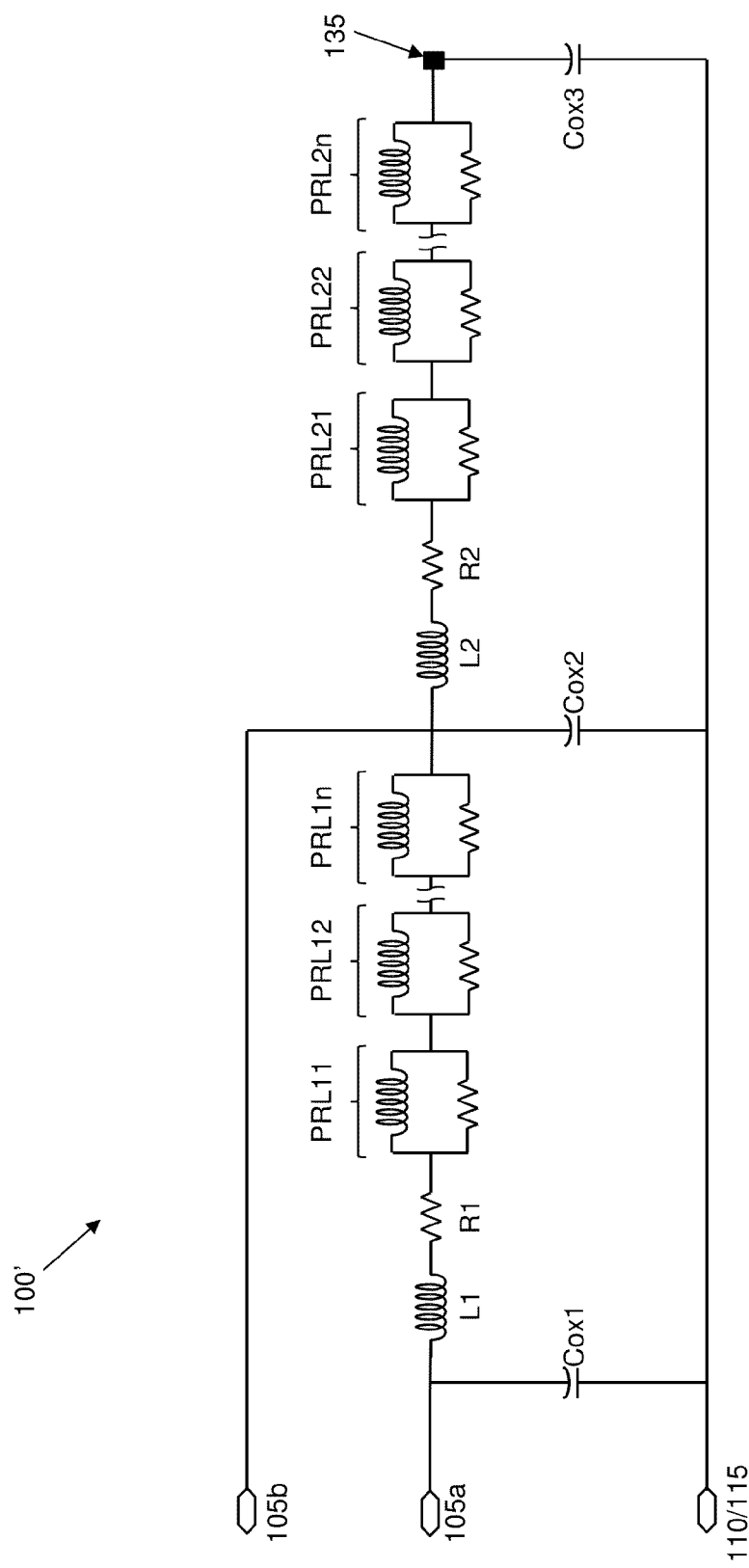
FIG. 6 shows a pad model diagram in accordance with aspects of the invention.

FIG. 6 shows a model 100' in accordance with aspects of the invention. In embodiments, the ground plane (e.g., ground plane 25') is assumed to be perfectly grounded to a ground, as is the substrate (e.g., substrate 30'), which is a valid assumption for a metal ground plane. In this manner, the model 100 of FIG. 5 reduces to the model 100' of FIG. 6. As shown in FIG. 6, the model 100' includes nodes 105a and 105b that correspond to the input and output ports of the pad, and a common node 110/115 that corresponds to the both the ground plane and the substrate (e.g., representing ground). The model 100' includes a first inductor L1, first resistor R1 and first string of PRLs, e.g., PRL11, PRL12, PRL1n, connected in series between node 105a and node 105b. The model 100' also includes a second inductor L2, second resistor R2 and second string of PRLs, e.g., PRL21, PRL22, PRL2n, connected in series between node 105b and node 135. The model 100' further includes a first capacitor Cox1 connected between node 105a and node 110/115, a second capacitor Cox2 connected between node 105b and node 110/115, a third capacitor Cox3 connected between node 135 and node 110/115.

According to aspects of the invention, the sizes of L1, R1, L2, R2 and Cox1, Cox2, Cox3 are determined to model propagation effect in the bond pad. Also, the sizes of the inductors and resistors in PRL11, PRL12, PRL1n, PRL21, PRL22, and PRL2n and/or the number "n" may be tuned to model skin effect in the bond pad. Moreover, the size of Cox3 is further tuned to model open circuit and radiation effect in the bond pad.

FIG. 7 shows an exemplary implementation of the model 100" in which the number of PRLs equals three (n=3) in accordance with aspects of the invention. In embodiments, the model 100" predicts an output signal 200 at node 105b based on an input signal 205 that is applied to node 105a. Exemplary sizes for the various elements are provided in Table 1, although the invention is not limited to these sizes and any desired sizes may be used within the scope of the invention.

TABLE 1

| Element | Size | Element | Size | Element | Size |
| --- | --- | --- | --- | --- | --- |
| Cox1 | 5.5 fF | L1 | 8.6 pH | R1 | 58.7 mΩ |
| Cox2 | 11.1 fF | L2 | 8.6 pH | R2 | 58.7 mΩ |
| Cox3 | 3.7 fF | L11 | 477.5 fH | R11 | 4.2 mΩ |
|  |  | L12 | 477.5 fH | R12 | 3.2 mΩ |
|  |  | L13 | 477.5 fH | R13 | 80.0 mΩ |
|  |  | L21 | 477.5 fH | R21 | 4.2 mΩ |
|  |  | L22 | 477.5 fH | R22 | 3.2 mΩ |
|  |  | L23 | 477.5 fH | R23 | 80.0 mΩ |

In embodiments, the model in accordance with aspects of the invention (e.g., model 100, 100', 100", etc.) may be implemented in a computer-based circuit simulator and sizes of the various elements (e.g., inductors, capacitors, resistors, diodes, etc.) contained in the model 100 may be adjusted in the simulator so that data predicted by the model most closely matches target data (e.g., using parameter estimation techniques). The target data may be obtained from measurements of signals applied to a physical bond pad. Additionally or alternatively, the target data may be obtained from another model, such as the reference model 300 shown in FIG. 8, which was a S-parameter model from an electromagnetic simulation. The completed model (e.g., model 100, 100', 100", etc.), after tuning to achieve acceptable agreement with target data, may be used, for example, as a library element in an integrated circuit design tool. The circuit simulator and/or design tool may be implemented in the environment of FIG. 11 described in greater detail herein.

Figure 9:
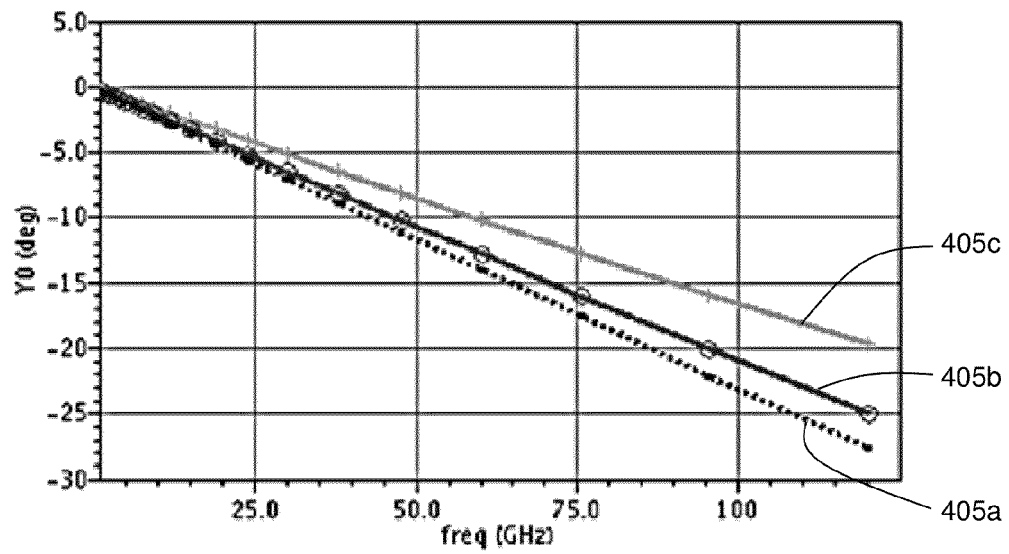
FIGS. 9 and 10 show data plots including predicted values of a model in accordance with aspects of the invention.
Figure 10:
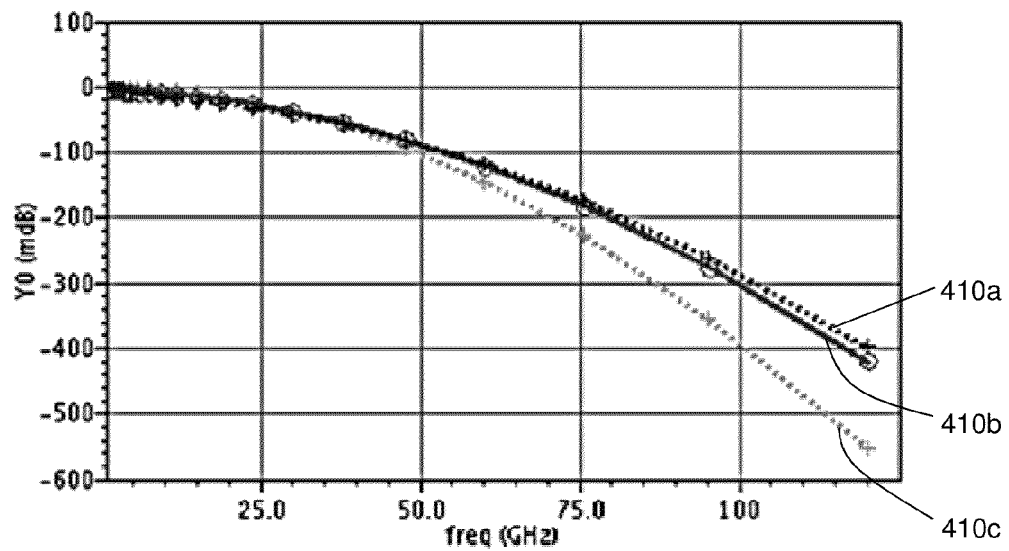

FIGS. 9 and 10 show plots comparing model-predicted data to target data for both a one port model (e.g., as in FIG. 3) and a two port model (e.g., as in FIGS. 5-7). In particular, FIG. 9 shows propagation phase of the pad for target data (line 405a), two port model (line 405b), and a one port model (line 405c) as a function of frequency. FIG. 10 shows attenuation behavior of the pad for target data (line 410a), two port model (line 410b), and a one port model (line 410c) as a function of frequency. The data in FIGS. 9 and 10 demonstrates that the two port model better approximates the target data compared to the one port model.

Pad models in accordance with aspects of the invention and as described herein thus provide a pad model with two ports, with the first port being located at the edge of the top metal shape of the pad and the second port being located at the center of the top metal shape of the pad. An L (inductor), C (capacitor) and R (resistor) sub-circuit topology provides accurate modeling of all effects from L, C and R parasitics, skin depth, propagation and radiation. In embodiments, at least two sections of LCR networks, C-L-R-C, are provided that split the pad from an equivalent point of view, wherein the second port is defined at the intersection between the two sections. In embodiments, there is a multiple-section skin depth sub-network in each of the two sections that captures the skin effect over frequency. Implementations of the invention thus relate to a two signal port model for an integrated circuit (IC) pad (e.g., bond pad) comprising: a first signal port (Port 1) located at an edge of the IC pad for connecting to the chip circuit; and a second signal port (Port 2) located at the center of the IC pad for connecting to the IC package or other off-chip circuits, wherein differences between the first signal port and the second signal port may be used to determine parasitics, such as inductance, capacitance, resistance, propagation and radiation effects, and further wherein the two signal ports extend the IC pad model to a higher frequency than a single port model.

Figure 11:
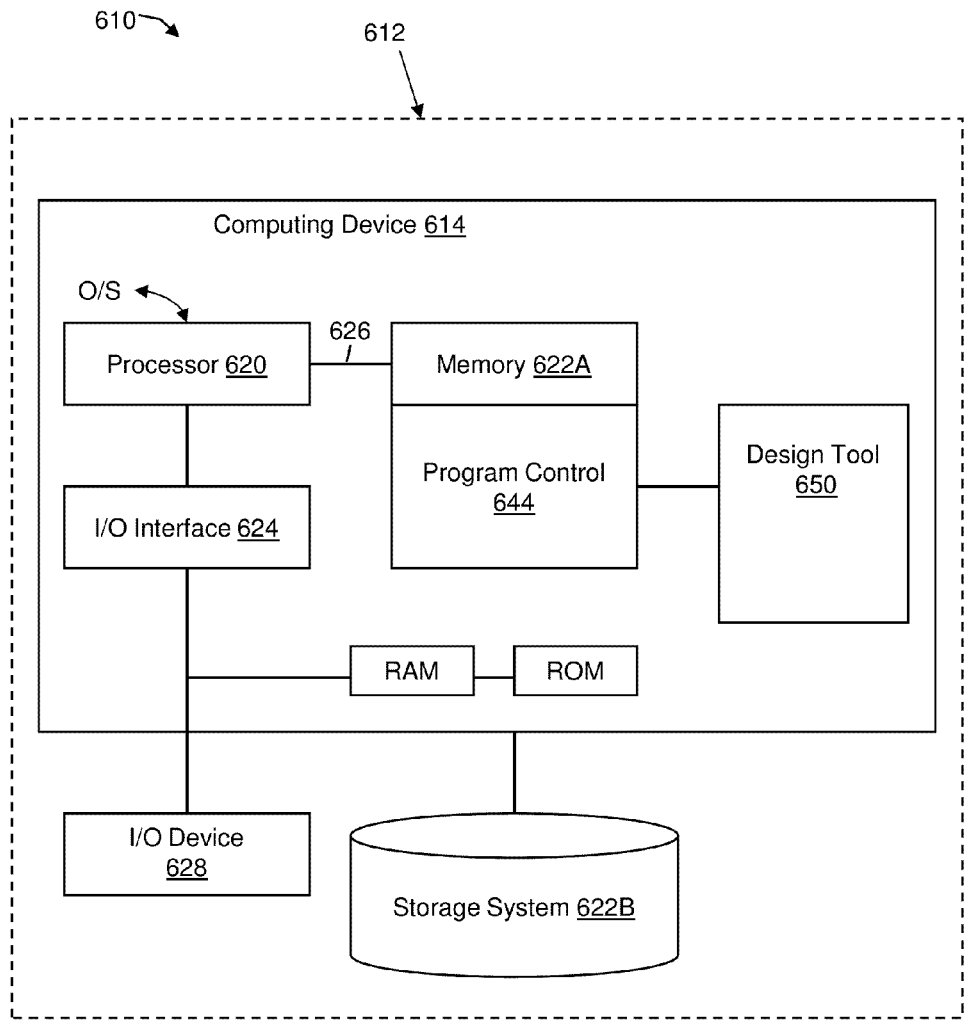
FIG. 11 shows an illustrative environment for performing the processes in accordance with the invention.

FIG. 11 shows an illustrative environment 610 for managing the processes in accordance with the invention. As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Still referring to FIG. 11, the environment 610 includes a server or other computing system 612 that can perform the processes described herein. In particular, the system 612 includes a computing device 614. The computing device 614 can be resident on a network infrastructure or computing device of a third party service provider (any of which is generally represented in FIG. 11).

The computing device 614 also includes a processor 620, memory 622A, an I/O interface 624, and a bus 626. The memory 622A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 614 is in communication with the external I/O device/resource 628 and the storage system 622B. For example, the I/O device 628 can comprise any device that enables an individual to interact with the computing device 614 (e.g., user interface) or any device that enables the computing device 614 to communicate with one or more other computing devices using any type of communications link. The external I/O device/resource 628 may be for example, a handheld device, PDA, handset, keyboard etc.

In general, the processor 620 executes computer program code (e.g., program control 644), which can be stored in the memory 622A and/or storage system 622B. Moreover, in accordance with aspects of the invention, the program control 644 controls a circuit simulator/design tool 650, e.g., that performs one or more of the processes described herein (e.g., generates a pad model). The circuit simulator/design tool 650 can be implemented as one or more program code in the program control 44 stored in memory 622A as separate or combined modules. Additionally, the circuit simulator/design tool 650 may be implemented as separate dedicated processors or a single or several processors to provide the function of these tools. While executing the computer program code, the processor 620 can read and/or write data to/from memory 622A, storage system 622B, and/or I/O interface 624. The program code executes the processes of the invention. The bus 626 provides a communications link between each of the components in the computing device 614.

The computing device 614 can comprise any general purpose computing article of manufacture capable of executing computer program code installed thereon (e.g., a personal computer, server, etc.). However, it is understood that the computing device 614 is only representative of various possible equivalent-computing devices that may perform the processes described herein. To this extent, in embodiments, the functionality provided by the computing device 614 can be implemented by a computing article of manufacture that includes any combination of general and/or specific purpose hardware and/or computer program code. In each embodiment, the program code and hardware can be created using standard programming and engineering techniques, respectively.

Similarly, the system 612 is only illustrative of various types of computer infrastructures for implementing the invention. For example, in embodiments, the system 612 comprises two or more computing devices (e.g., a server cluster) that communicate over any type of communications link, such as a network, a shared memory, or the like, to perform the process described herein. Further, while performing the processes described herein, one or more computing devices on the system 612 can communicate with one or more other computing devices external to the system 612 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 12:
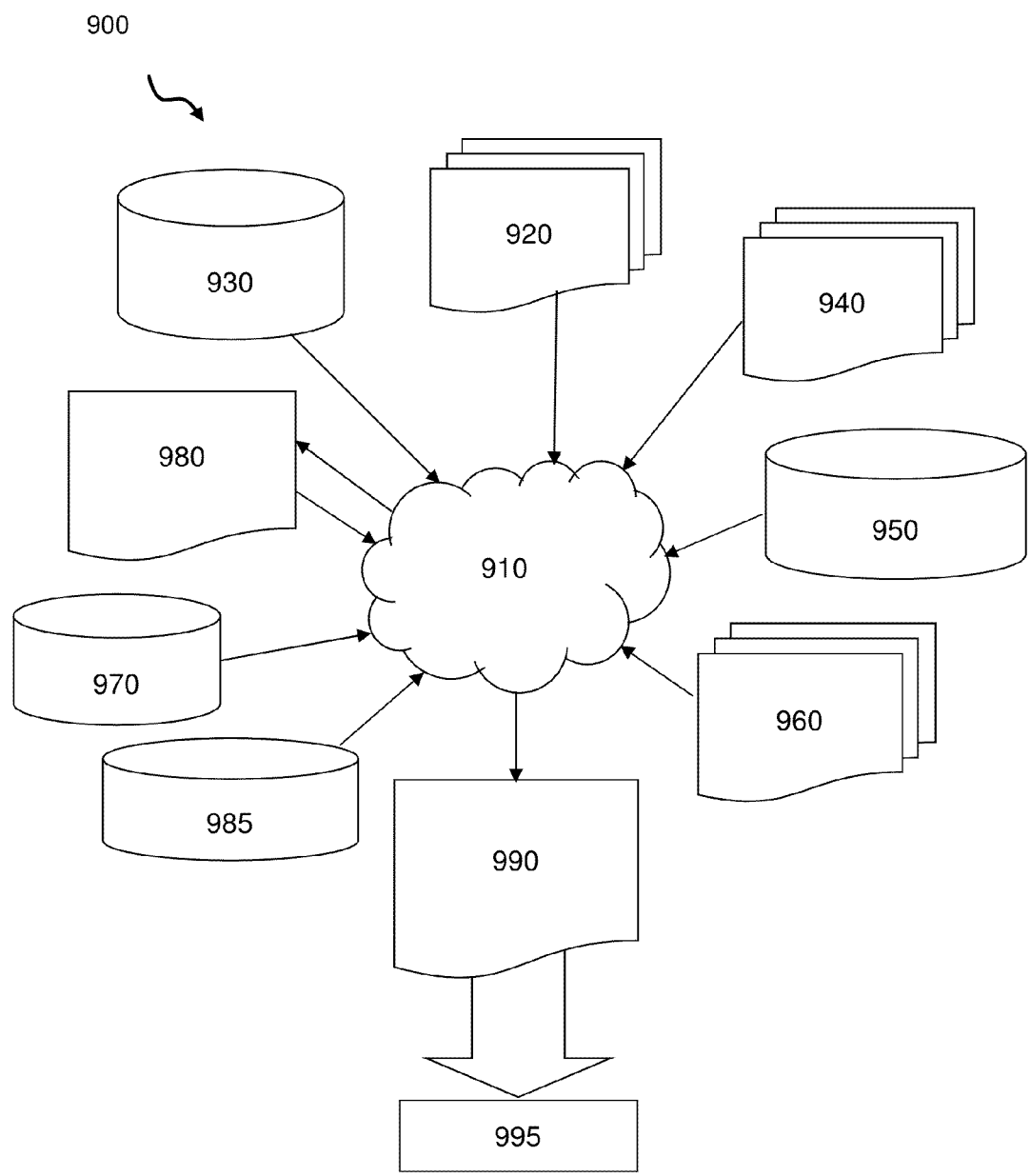
FIG. 12 is a flow diagram of a design process used in semiconductor design, manufacture, and/or test.

FIG. 12 is a flow diagram of a design process used in semiconductor design, manufacture, and/or test. FIG. 12 shows a block diagram of an exemplary design flow 900 used for example, in semiconductor IC logic design, simulation, test, layout, and manufacture. Design flow 900 includes processes, machines and/or mechanisms for processing design structures or devices to generate logically or otherwise functionally equivalent representations of the design structures and/or devices described above and shown in FIGS. 5-7. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 12 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system such as those shown in FIGS. 5-7. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures shown in FIGS. 5-7 to generate a netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990.

Design structure 990 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 5-7. In one embodiment, design structure 990 may comprise a compiled, executable HDL simulation model that functionally simulates the devices shown in FIGS. 5-7.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 5-7. Design structure 990 may then proceed to a stage 995 where, for example, design structure 990: proceeds to tape-out, is released to manufacturing, is released to a mask house, is sent to another design house, is sent back to the customer, etc.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method of modeling an integrated circuit chip, comprising:
    generating a model of a bond pad using a design tool running on a computer device;
    connecting a first inductor, a first resistor, and a first set of parallel-resistor-inductor elements in series between a first node and a second node in the model; and
    connecting a second inductor, a second resistor, and a second set of parallel-resistor-inductor elements in series between the second node and a third node in the model;
    wherein the first node corresponds to a first signal port of the bond pad; and
    the second node corresponds to a second signal port of the bond pad.

2. The method of claim 1, wherein the first signal port and the second signal port are at different locations on the bond pad.

3. The method of claim 2, wherein:
    the first signal port is at a side edge of the bond pad; and
    the second signal port at a substantial center of the bond pad.

4. The method of claim 3, wherein:
    the first signal port connects to a circuit in the chip; and
    the second signal port connects to a circuit off the chip.

5. The method of claim 1, further comprising tuning the model for skin effect between the first signal port and the second signal port.

6. The method of claim 5, wherein the tuning the model for skin effect comprises at least one of:
    adjusting a number of the first set of parallel-resistor-inductor elements;
    adjusting a resistance and an inductance of each one of the elements in the first set of parallel-resistor-inductor elements;
    adjusting a number of the second set of parallel-resistor-inductor elements; and
    adjusting a resistance and an inductance of each one of the elements in the second set of parallel-resistor-inductor elements.

7. The method of claim 1, further comprising:
    providing a first capacitor between the first node and a fourth node;
    providing a second capacitor between the second node and a fifth node; and
    providing a third capacitor between the third node and a sixth node.

8. The method of claim 7, further comprising tuning the model for propagation effect between the first signal port and the second signal port.

9. The method of claim 8, wherein the tuning the model for propagation effect comprises at least one of:
    adjusting an inductance of the first inductor;
    adjusting an inductance of the second inductor;
    adjusting a mutual inductance between the first and second inductors
    adjusting a resistance of the first resistor; and
    adjusting a resistance of the second resistor
    adjusting capacitances of the first, second and third capacitors.

10. The method of claim 8, further comprising tuning the model for radiation effect between the first signal port and the second signal port.

11. The method of claim 10, wherein the tuning the model for radiation effect comprises adjusting a capacitance of the third capacitor.

12. The method of claim 1, further comprising:
    connecting a third inductor, a third resistor, and a third set of parallel-resistor-inductor elements in series between a fourth node and a fifth node in the model; and
    connecting a fourth inductor, a fourth resistor, and a fourth set of parallel-resistor-inductor elements in series between the fifth node and a sixth node in the model;
    wherein the fourth node corresponds to a ground plane of the bond pad.

13. The method of claim 12, further comprising:
    connecting a first diode-resistor pair in series between the fourth node and a seventh node in the model;
    connecting a second diode-resistor pair in series between the fifth node and the seventh node in the model; and
    connecting a third diode-resistor pair in series between the sixth node and the seventh node in the model,
    wherein the seventh node corresponds to a substrate of the chip.

14. The method of claim 13, further comprising tuning the model for parasitic resistance and parasitic capacitance between the ground plane and the substrate.

15. The method of claim 14, wherein the tuning the model for parasitic resistance and parasitic capacitance comprises adjusting sizes of the first diode-resistor pair, the second diode-resistor pair, and the third diode-resistor pair.

16. A computer program product for modeling an integrated circuit chip, the computer program product comprising a computer readable storage device having program code embodied therewith, the program code being readable and/or executable by a processor of a computer device to perform a method comprising:
- generating, by the processor, a model of a bond pad;
- connecting, by the processor, a first combination of inductors and resistors between a first node and a second node in the model;
- connecting, by the processor, a second combination of inductors and resistors between the second node and a third node in the model; and
- connecting, by the processor, a first capacitor between the first node and a fourth node, a second capacitor between the second node and a fifth node, and a third capacitor between the third node and a sixth node,
- wherein the first node represents a first signal port of the bond pad;
- the second node represents a second signal port of the bond pad; and
- the first signal port and the second signal port are at different locations on the bond pad.

17. A method in a computer-aided design system for generating a functional design model of a bond pad, said method comprising:
- generating, by the computer-aided design system, a functional representation of a first combination of inductors and resistors connected in series between a first node and a second node;
- generating, by the computer-aided design system, a functional representation of a second combination of inductors and resistors connected in series between the second node and a third node; and
- generating, by the computer-aided design system, a functional representation of a first capacitor between the first node and a fourth node, a second capacitor between the second node and a fifth node, and a third capacitor between the third node and a sixth node,
- wherein the first node represents a first signal port of the bond pad;
- the second node represents a second signal port of the bond pad; and
- the first signal port and the second signal port are at different locations on the bond pad.

18. The method of claim 17, wherein the design model comprises a netlist.

19. The method of claim 17, wherein the design model resides on storage medium as a data format used for the exchange of layout data of integrated circuits.

20. The method of claim 17, wherein the design model resides in a programmable gate array.

\* \* \* \* \*